United States Patent [19]

Han

[11] Patent Number: 4,570,497
[45] Date of Patent: Feb. 18, 1986

[54] DOUBLE CASING WATER METER

[75] Inventor: Eui M. Han, Seoul, Rep. of Korea

[73] Assignee: Shinhan Kongki Co. Ltd., Incheon, Rep. of Korea

[21] Appl. No.: 607,678

[22] Filed: May 7, 1984

[30] Foreign Application Priority Data

Jun. 24, 1983 [KR] Rep. of Korea ............... 2860/1983

[51] Int. Cl.⁴ ............................................. G01F 1/05
[52] U.S. Cl. .................................................. 73/861.79
[58] Field of Search ....................... 73/861.33, 861.79

[56] References Cited

U.S. PATENT DOCUMENTS

| 404,374 | 6/1889 | Ball ..................................... 73/861.79 |
| 630,441 | 8/1899 | Beckmann .......................... 73/861.79 |
| 1,094,058 | 4/1914 | Christman ......................... 73/861.79 |
| 3,162,422 | 12/1964 | Renfrew ............................ 73/861.79 |

FOREIGN PATENT DOCUMENTS 1203170 1/1960 France ............................... 73/861.79
0044810 4/1981 Japan ................................ 73/861.79

Primary Examiner—Herbert Goldstein
Attorney, Agent, or Firm—Robin, Blecker & Daley

[57] ABSTRACT

A double casing water meter includes a casing having an inlet port, a water chamber in fluid communication with the inlet port, an outlet port and a water discharging chamber in fluid communication with the outlet port. An inner casing has a bottom plate defining at least one water inflow passage extending between the water chamber and the water discharging chamber, and a water inflow tube opening at its opposed ends respectively into the water inflow passage and the water chamber and inclined relative to the bottom plate. A vane wheel is supported for rotation in the casing upon issuance of water from the water inflow passage and has individual vanes successively disposed in intersecting relation to the longitudinal axis of the tube in the course of the vane wheel rotation.

3 Claims, 13 Drawing Figures

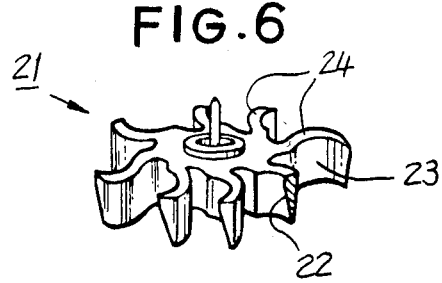
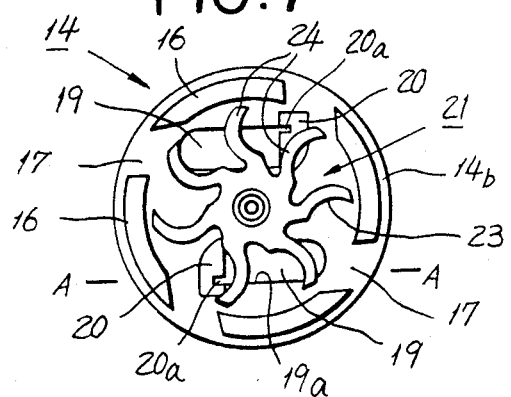
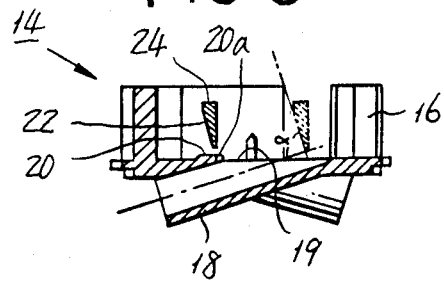

DOUBLE CASING WATER METER

FIELD OF THE INVENTION

The present invention relates to a double casing water meter and more particularly to an improvement of the construction of the inner lower casing and the vane wheel of the conventional double casing water meter, whereby an optimum rotational condition for the vane wheel can be ensured and the overall height and volume of the water meter can be substantially reduced.

BACKGROUND OF THE INVENTION

The conventional single casing water meter as shown in FIG. 1 of the accompanying drawings consists of a water chamber 2 arranged in the lower portion of the meter casing, a vane wheel 3 mounted within said water chamber 2, an inlet port 1a and an outlet port 1b each integrally formed on both sides of, and substantially at a level with, said water chamber 2, wherein said inlet and outlet ports 1a and 1b directly communicate with said water chamber 2.

Therefore, in operation of such a single casing water meter, said vane wheel and the registering mechanism (not shown in the drawings) receives a sudden impact caused by a water hammer, whereby said vane wheel 3 rotates under the one-sided pressure applied from said inlet port 1a, so that the vane wheel shaft and bearing or pivot are subjected to one-sided abrasion, thus resulting in inaccurate measurement and shortening the instrument life.

In order to eliminate such disadvantages of the single casing water meter and to improve the rotational condition thereof, the conventional double casing water meter as shown in FIG. 2 of the accompanying drawings has been constructed in such fashion that the lower portion of the outer casing 1 is swelled out into a predetermined depth to accommodate an inner lower casing 6 within the expanded water chamber 2, said lower casing comprising a vane wheel chamber 4 and a water discharging chamber 5 integrally formed with and above the vane wheel chamber 4.

However, the height of said vane wheel chamber 4 and said water discharging chamber 5 becomes relatively higher as compared with the single casing water meter, and the water pool 2a of a considerable volume is inevitably formed around the entire surroundings of said vane wheel chamber 4, thus substantially increasing the size of the water meter.

Furthermore, in operation of the above conventional double casing water meter, the water incoming from the inlet 1a provided on the outer casing 1 flows via said water chamber 2 and through the water inflowing holes 7 provided on the cylindrical wall 4a of said vane wheel chamber 4 into the vane wheel chamber 4 and further rises up into the discharging chamber 5, thereby turning the vane wheel 3. The water then passes through the water discharging holes 5a provided on the cylindrical wall of said water discharging chamber 5 and flows through the water passage 9 formed between the cylindrical wall 5b and the inside wall of said outer casing 1, finally being discharged through said outlet 1b of said outer casing 1.

Such complicated inflowing and outflowing paths will cause head loss, thereby increasing the loss of water pressure. Consequently, the maximum amount of the flowing water is decreased because water flows out from said outlet 1b under a reduced pressure.

In the above conventional double casing water meter, floating substances, such as fine sand particles and sludge contained in the flowing water, are raised from the bottom 4b of said vane wheel chamber 4 up to the level of said water discharging holes 5a to be discharged therethrough with much difficulty by the running force of the inflowing water and by the water whirl caused by the high speed rotation of said vane wheel 3.

However, if the floating substances are relatively heavier and greater, or when the vane wheel 3 rotates very slowly, said floating substances will settle to the bottom 4b of said vane wheel chamber 4, thereby hampering the rotation of said vane wheel 3, or said floating substances are deposited in the water passage 9, thereby obstructing the water flow therethrough, and as a result thereof, the water meters often fail to fulfill the measuring function and become out of order, which is thus well known through long experience. In the accompanying drawings, the reference number 10 designates the upper inner casing which is not described in this specification.

As described above, the lower portion of the outer casing 1 of the prior double casing water meter is swelled out to form a relative greater water chamber 2 with a sufficient size in width and depth in order to let the water flow smoothly into the vane wheel chamber 4 via the inflowing holes 7, thus increasing the volume and weight of the outer casing 1 and accordingly requiring more materials in proportion to its size, and causing a great head loss due to the complicated inflowing and outflowing paths, and frequently resulting in operational troubles due to the accumulated floating substances.

SUMMARY OF THE INVENTION

Accordingly, the object of the present invention is to eliminate these problems and disadvantages of the prior double casing water meter.

In attaining the foregoing and other objects, the invention provides a double casing water meter comprising a casing having an inlet port, a water chamber in fluid communication with the inlet port, an outlet port and a water discharging chamber in fluid communication with the outlet port, an inner casing having a bottom plate defining at least one water inflow passage extending between the water chamber and the water discharging chamber, and a water inflow tube opening at its opposed ends respectively into the water inflow passage and the water chamber and inclined relative to the bottom plate. A vane wheel is supported for rotation in the casing upon issuance of water from the water inflow passage and has individual vanes successively disposed in intersecting relation to the longitudinal axis of the tube in the course of the vane wheel rotation. Such intersecting relation is preferably ninety degrees and means are desirably included for increasing water flow velocity at the point of issuance of water from the water inflow passage.

The invention will be further understood from the following description of a preferred embodiment in accordance with the present invention which is shown in the drawings wherein like reference numerals are employed to identify like parts throughout.

DESCRIPTION OF THE DRAWINGS

The drawings in FIG. 3 illustrate the construction of the double casing water meter of FIG. 2 above, where

The drawings of FIG. 4 illustrate the double casing water meter in accordance with the present invention, where

The drawings of FIG. 5 illustrate the inner lower casing in accordance with the present invention, where

FIG. 6 is a perspective view of the vane wheel in accordance with the present invention showing a partially cutaway vane blade;

FIG. 7 is a plan view showing the vane wheel mounted within the inner lower casing in accordance with the present invention;

FIG. 8 is a longitudinal sectional view taken on the line A—A of FIG. 7, showing the angle formed between the longitudinal axis of the inclined tube and the inclined surface of the vane blade.

DESCRIPTION OF THE PREFERRED EMBODIMENT

Figure 1:
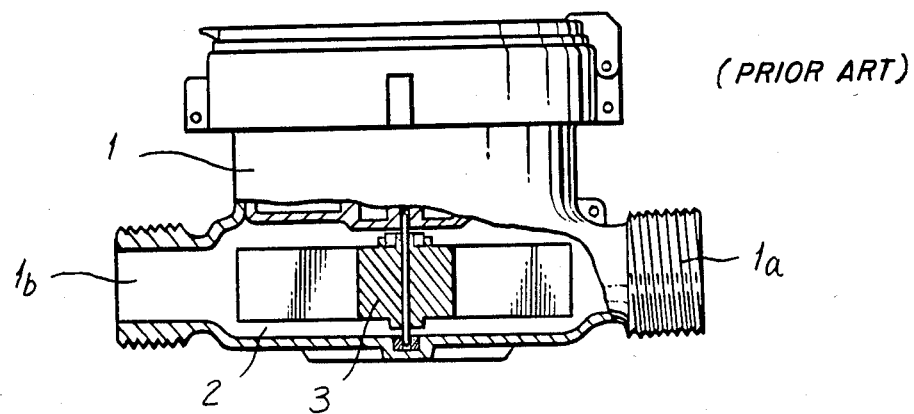
FIG. 1 is a partially cutaway front view of the conventional single casing water meter.
Figure 2:
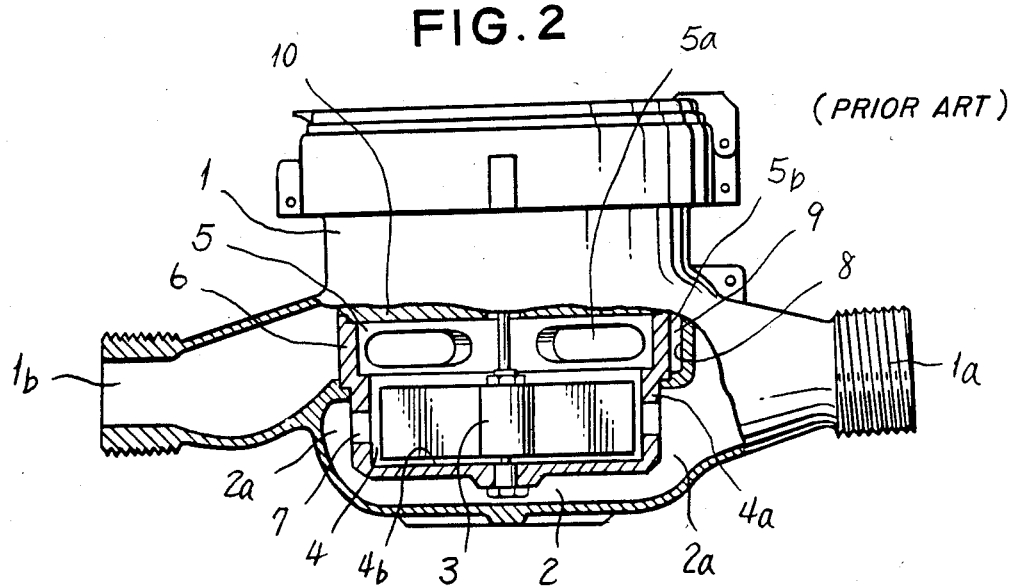
FIG. 2 is a partially cutaway front view of the conventional double casing water meter.
Figure 3A:
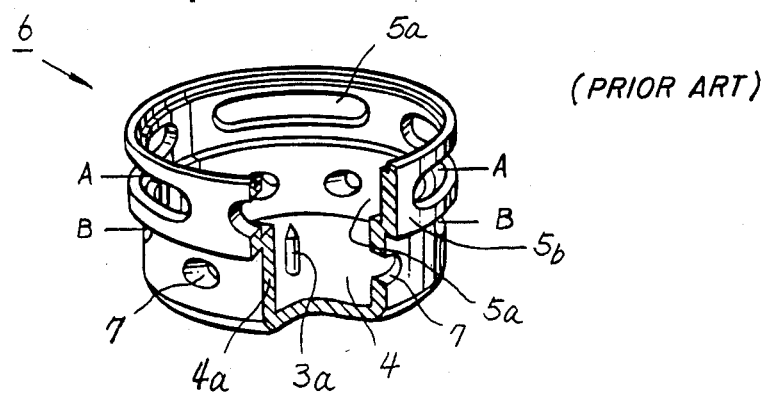
FIG. 3(A) is a partially cutaway perspective view of the inner lower casing.
Figure 3B:
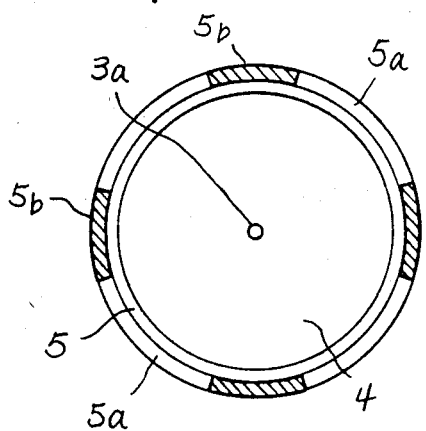
FIG. 3(B) is a cross-sectional view taken on the line A—A of FIG. 3(A)
Figure 3C:
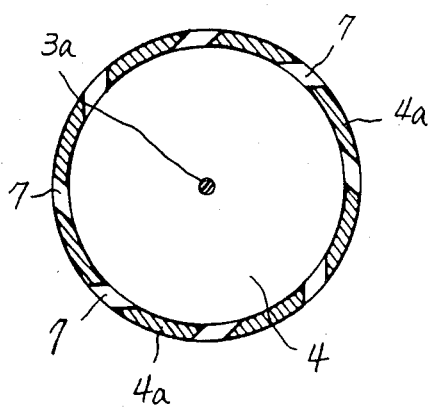
FIG. 3(C) is a cross-sectional view taken on the line B—B of FIG. 3(A).
Figure 4A:
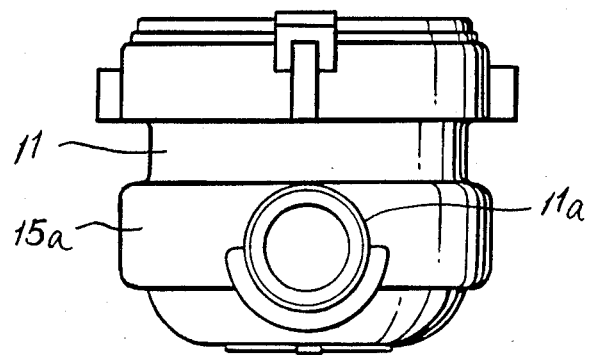
FIG. 4(A) is a front view seen from the inlet side.
Figure 4B:
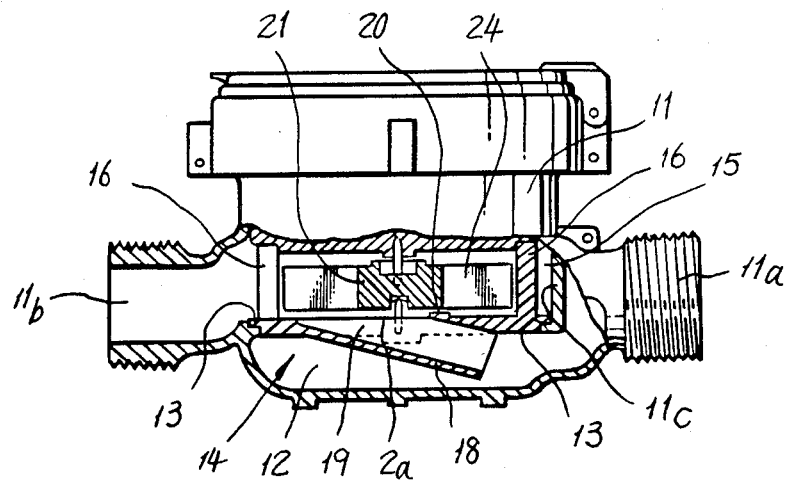
FIG. 4(B) is a partially cutaway front view of said double casing water meter with the respective inlet and outlet ports on both sides.
Figure 5A:
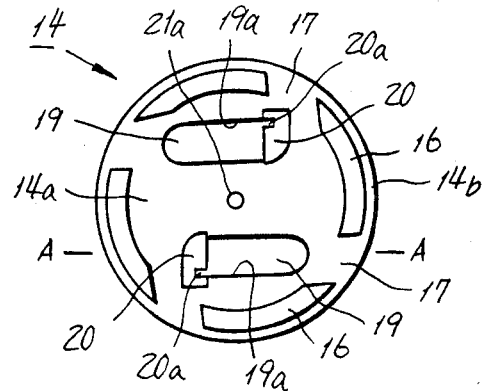
FIG. 5(A) is a plan view of said inner lower casing.
Figure 5B:
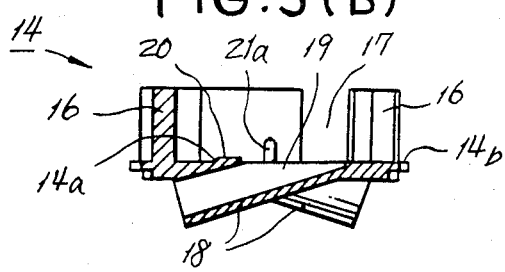
FIG. 5(B) is a longitudinal sectional view taken on the line A—A of FIG. 5(A)
Figure 5C:
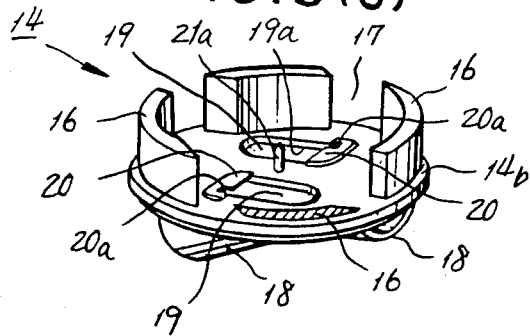
FIG. 5(C) is a partially cutaway perspective view of FIG. 5(A)

Referring to the drawings, the novel double casing water meter of the present invention is characterized in that the vane wheel chamber 4 and the water discharging chamber 5 both constituting together the inner lower casing of the prior art are combined into a simple combined vane wheel chamber of the present invention, thereby reducing the overall volume of the inner lower casing and thus of the outer casing, and consequently imparting an optimum rotational condition to the vane wheel.

The outer casing 11 of the present invention is provided with a mounting step 13 above the water chamber 12 for mounting the inner lower casing 14 on said step 13, which is similar to the construction of the prior art.

In the construction of the outer lower casing of the present invention, the corresponding cylindrical portion 11c thereof around the cylindrical wall 16 of the inner lower casing 14 is swelled out bandlike in width corresponding to the height of the inner lower casing 14 to form an annular projection 15a, the inside of which forms in turn an annular groove 15 extending as a water path (hereinafter referred to as "water passage 15"). The inlet port 11a and the outlet port 11b are positioned in a straight line, integrally formed on the opposite sides of the annular projection 15a, wherein said inlet port 11a communicates with said water chamber 12 and said outlet port 11b communicates with the water discharging holes 17 provided on the cylindrical wall 16 of the inner lower casing 14.

Said inner lower casing 14 of the present invention comprises a circular bottom plate 14a, a cylindrical wall 16 vertically arranged on said bottom plate 14a along the circumference spaced at a predetermined distance 14b from the peripheral edge of said bottom plate 14a (at a space required for the formation of said water passages 15), one or more water discharging holes 17 provided, at predetermined intervals, on said cylindrical wall 16, wherein each hole 17 is cut open in the direction of the water flow, and then said bottom plate 14a has one or more water inflowing holes or water inflow passages 19 generally shaped rectangular, and one or more inclined water inflowing tubes 18, each being securely attached to said bottom plate 14a respectively from underside.

Furthermore, an intercepting protrusion 20 is formed on each front edge of said water inflowing holes 19, and a small and narrow recess 20a is formed in said intercepting protrusion 20 along the outer edge 19a of said water inflowing holes 19, whereby the pressure of water inflowing through said recess 20a can be increased.

In the embodiment of the inner lower casing 14 in accordance with the present invention, said water inflowing holes 19 are not limited only to the rectangular shape, but can be formed square, eliptical, circular, polygonal or any variation thereof, and the size of said water inflowing holes 19 is determined according to the number thereof.

In accordance with the present invention, the angle of said inclined water inflowing tubes 18 shall be from about ten to twenty-five degrees and preferably from sixteen to eighteen degrees, which will induce the most effective water pressure, wherein said angle is determined according to the shape of the vane wheel 21.

The vane wheel 21 of the present invention is mounted on the center shaft 21a provided in the middle of the bottom plate 14a of the inner lower casing 14, and said vane wheel 21 consists of a plurality of vane blades 24, each blade being curved to form a concave portion 23, the depressed surface 22 of which is preferably inclined at a right angle to the uprising water flowing out from said water inflowing holes 19, so that the water pressure can be effectively applied to and enveloped by said vane blades 24. Such depressed surface is thus disposed to intersect the longitudinal axis of tubes 18.

In the operation of the above double casing water meter in accordance with the present invention, the water inflowing from said inlet port 11a flows via said water chamber 12 and through said inclined water inflowing tubes 18 into said inner lower casing 14 (vane wheel chamber), and flows out via said water discharging holes 17 and through said outlet port 11b, thereby the inflowing water running against said concave portion 23 and at the same time against said inclined surfaces 22 of said vane blades 24 at a right angle to generate the turning force of said vane wheel 21.

As hereinbefore described, the construction of the water inflowing and outflowing passages is simplified so as to minimize the head loss as far as possible. In addition thereto, the circular bottom plate 14a and the lower surfaces of the water discharging holes 17 are formed at the same level, so that fine floating substances contained in the inflowing water can be easily discharged through said water discharging holes 17 even by a very small amount of flowing water without being settled to, and accumulated on, the bottom of said inner lower casing 14.

One of the important objects of the present invention is to improve the sensitivity of the water meter, in other words, to minimixe the starting water flow sufficient to generate turning force on the vane wheel. As described above, in order that the vane wheel 21 can be rotated by a very low speed of the inflowing water when the water flow in-coming from said water inflowing holes 19 is reduced to a very small amount, an intercepting protrusion 20 is provided on each front edge of the water inflowing holes 19, and a small and narrow recess 20a if formed into said intercepting protrusion 20, whereby the inflowing water passes through said recess 20a, and thus the pressure head of the inflowing water from said inclined tubes 18 will be converted into velocity head at the moment of passing through said narrow recesses 20a, thereby increasing the speed of the inflowing water of a very small amount and generating turning force on said vane wheel 21.

As mentioned above, the present invention is characterized in that the construction of the outer casing 11, the inner lower casing 14, and the vane wheel 21 is greatly improved and simplified, thereby reducing the overall volume of the water meter, and thus saving manufacturing materials and production cost, that head loss resulting from the inflowing and outflowing passage is minimized, that floating substances are easily discharged by the uprising water flow without being settled to the bottom of the inner lower casing 14, thereby eliminating the possible troubles caused by the accumulated deposits, and that the vane wheel 21 can be rotated by a very small amount of flowing water, thereby ensuring the optimum rotational condition of the vane wheel and the correct measurement of the water used.

Various changes may be made to the illustrated embodiment without departing from the invention. Thus, the particularly shown water meter is intended in an illustrative and not in a limiting sense. The true spirit and scope of the invention is set forth in the following claims.

I claim:

1. A double casing water meter comprising: an inlet port and an outlet port, a water chamber, an inner lower casing having a circular bottom plate with one or more water inflowing holes and one or more water inflowing tubes in fluid communication with said water inflowing holes and a cylindrical wall with one or more water discharging holes, and a vane wheel with a plurality of vane blades mounted within said inner lower casing, wherein each of said vane blades has a concave portion with an inclined surface perpendicular to the longitudinal axis of said water inflowing tubes, characterized in that the water inflowing from said inlet port flows via said water chamber and through said water inflowing tubes into said inner lower casing, the inflowing water thereby running against said concave portion and at the same time against said inclined surfaces of said vane blades, at a right angle to generate turning force on said vane wheel, and flows out via said water discharging holes and through said outlet port.

2. A double casing water meter according to claim 1 wherein said cylindrical wall is vertically arranged on the upper side of said bottom plate along the circumference spaced at a predetermined distance from the peripheral edge of said bottom plate, and a plurality of water discharging holes are provided, at predetermined intervals, around said cylindrical wall, the lower surface of said holes being at the same level with said bottom plate, and wherein said bottom plate has one or more intercepting protrusions each provided on the respective front ends of said water inflowing holes, each intercepting protrusion having a small narrow recess formed thereinto along the outer edge of said water inflowing holes.

3. A double casing water meter according to claim 1 wherein said vane wheel comprises a plurality of vane blades integrally formed therewith, each blade being curved to form a concave portion for enveloping the inflowing water from said water inflowing holes through said inclined water inflowing tubes and at the same time being inclined to form an inclined surface perpendicular to the longitudinal axis of the inclined water inflowing tubes.

* * * * *